United States Patent [19]

Crutchfield et al.

[11] 4,146,495

[45] Mar. 27, 1979

[54] DETERGENT COMPOSITIONS COMPRISING POLYACETAL CARBOXYLATES

[75] Inventors: Marvin M. Crutchfield, Creve Coeur; Victor D. Papanu, Maryland Heights, both of Mo.; Craig B. Warren, Rumson, N.J.

[73] Assignee: Monsanto Company, St. Louis, Mo.

[21] Appl. No.: 826,426

[22] Filed: Aug. 22, 1977

[51] Int. Cl.$^2$ .............................................. C11D 3/38
[52] U.S. Cl. .................................. 252/89 R; 252/132; 252/180; 252/523; 252/527; 252/541; 252/546; 252/DIG. 2; 252/DIG. 11; 260/823; 528/230; 528/270
[58] Field of Search ......... 252/89, 132, 180, DIG. 11, 252/DIG. 2, 523, 527, 541, 546; 260/823; 528/230, 270

[56] References Cited

U.S. PATENT DOCUMENTS

| | | | |
|---|---|---|---|
| 2,264,103 | 11/1941 | Tucker | 210/23 |
| 3,278,491 | 10/1966 | Rosen | 528/231 |
| 3,629,121 | 12/1971 | Eldib | 252/89 |
| 3,665,000 | 5/1972 | Hills | 252/89 X |
| 3,704,320 | 11/1972 | Lannert | 252/546 |
| 3,706,672 | 12/1972 | Martin | 252/156 |
| 3,725,290 | 4/1973 | Nelson | 252/110 |
| 3,742,045 | 6/1973 | Lannert | 252/180 X |
| 3,758,419 | 11/1973 | Hayden | 252/551 |
| 3,776,850 | 12/1973 | Pearson | 252/89 |
| 3,781,349 | 12/1973 | Ramsey | 260/535 P |
| 3,784,475 | 1/1974 | Diehl | 252/89 |
| 4,021,376 | 5/1977 | Lamberti | 252/542 |

*Primary Examiner*—Dennis L. Albrecht
*Attorney, Agent, or Firm*—S. M. Tarter; E. P. Grattan; F. D. Shearin

[57] ABSTRACT

Ether and acetal carboxylates useful as detergent builders to replace sodium tripolyphosphate (STP) in detergent formulations are known to the art. Certain polymeric polycarboxylates are also known to the art but all of these products suffer from either having poor builder properties or they are not readily biodegradable. According to the present invention, new and novel polyacetal carboxylates are provided which are stable under laundry use conditions, but depolymerize in acid media, making the fragments more readily biodegradable in waste streams.

24 Claims, No Drawings

DETERGENT COMPOSITIONS COMPRISING POLYACETAL CARBOXYLATES

BACKGROUND OF THE INVENTION

This invention relates to detergent compositions, and more particularly to detergent compositions containing polyacetal carboxylates.

The property possessed by some materials of improving detergency levels of soaps and synthetic detergents and the use of such materials in detergent compositions is known. Such cleaning boosters are called "builders" and such builders permit the attainment of better cleaning performance than is possible when so-called unbuilt compositions are used. The behavior and mechanisms by which builders perform their function are only partially understood. It is known that good builders must be able to sequester most of the calcium and/or magnesium ions in the wash water since these ions are detrimental to the detergency process. However, it is difficult to predict which class of compounds possess useful combinations of builder properties and which compounds do not because of the complex nature of detergency and the countless factors which contribute both to overall performance results and the requirements of environmental acceptability.

Sodium tripolyphosphate (STP) has been found to be a highly efficient cleaning and detergent builder and this compound has been widely used for decades in cleaning and detergent formulations. Indeed, millions of pounds of STP are used each year in cleansing formulations because of its superior builder qualities. However, because of the recent emphasis on removing phosphates from detergent and cleaning compositions for environmental reasons, the detergent and cleaning industry is now looking for materials suitable for use as builders which do not contain phosphorus, and which are environmentally acceptable.

A large number of materials which do not contain phosphorus have been evaluated for use in detergent and cleaning formulations as a builder, but all of these materials suffer one or more disadvantages, usually either poor builder properties or poor biodegradability. As an example, U.S. Pat. No. 3,692,685 discloses salts of oxydisuccinic acid and carboxy methyl oxysuccinic acid as detergent builders and U.S. Pat. No. 3,708,436 discloses a mixture of polymeric maleic anhydride with sodium nitrilotriacetate or STP. Numerous U.S. Patents, such as U.S. Pat. No. 3,704,320, disclose ether carboxylates as detergency builders and several references, such as U.S. Pat. Nos. 3,764,586 and 3,308,067, disclose polymeric, aliphatic polycarboxylic acids having certain specific structural relationships useful as builders.

Despite the advances taught in these and other references in the prior art to find a cleaning and detergency builder which does not contain phosphorus, all of these materials suffer from one or more disadvantages. Of the above mentioned materials, those that are biodegradable are not equivalent to STP in builder performance, and of those that are equivalent to STP in builder performance, they are usually biodegradable only with great difficulty. Inorganic builders other than STP are generally not satisfactory for use as a builder in detergent formulations because of their poor builder properties. Sodium aluminum silicates, commonly known as zeolites, have been proposed for use in detergent formulations since they are able to soften water by removing calcium ions; however, they are not very effective in removing magnesium ions from water. Moreover, it is clear that such water-insoluble, clay-like materials have the potential problem of producing a sediment in the cleaning solution and the resulting waste waters.

Thus, it can be seen that there is a need for a new class of materials with builder properties equivalent to STP, which does not contain phosphorus, which is water-soluble, and which achieve environmental acceptability by being readily biodegradable. Now, according to the present invention, there is provided a new class of polyacetal carboxylates which are equal to, if not superior to, STP and which will depolymerize rapidly in a non-alkaline medium to form low molecular weight components which are readily biodegradable.

SUMMARY OF THE INVENTION

These and other advantages are achieved by a detergent composition comprising at least 5 percent by weight of a surfactant selected from the group consisting of anionic, nonionic, zwitterionic, ampholytic and amphoteric surfactants; and at least 1 weight percent of a stabilized, water-soluble polymer comprising polyacetal carboxylate segments having the structure

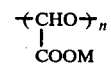

wherein M is selected from the group consisting of alkali metal, ammonium, tetralkyl ammonium and alkanol amine groups having from 1 to about 4 carbon atoms in the alkyl chain; and n averages at least 4.

Broadly described, the compositions of the present invention can be prepared by bringing together under polymerization conditions an ester of glyoxylic acid and a polymerization initiator. The resulting polyacetal carboxylate ester is then attached to chemically stable end groups to stabilize the polyacetal carboxylate against rapid depolymerization in alkaline solution, converted to the corresponding salt, and adding the salt to a surfactant.

For the purposes of this invention, the term "rapid depolymerization in alkaline solution" as it is used in the specification and claims, shall mean that in an aqueous solution of 0.5 molar sodium hydroxide containing 10 grams per liter of polyacetal carboxylate, the average chain length of the polyacetal carboxylate will be reduced by more than 50 percent, as determined by Proton Magnetic Resonance, after 1 hour at 20° C.

Any number of esters of glyoxylic acid can be used to prepare the polyacetal carboxylates of the present invention. Such esters can be made by the reaction of an alcohol containing from 1 to 4 carbon atoms with glyoxylic acid hydrate under conditions known to those skilled in the art. Thereafter, the ester hemiacetal can be converted to the corresponding aldehyde ester by any number of techniques known to those skilled in the art, such as the reaction of the ester hemiacetal with phosphorus pentoxide. The product of the above reaction is then polymerized by techniques known to those skilled in the art using an initiator in accordance with the following general equation:

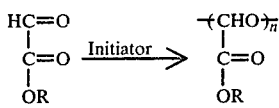
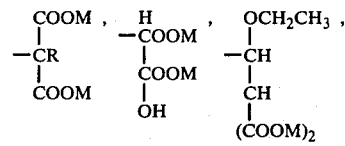 (I)

The resulting polyacetal carboxylate ester is then reacted at its termini with a reagent which produces a chemically stable end group to stabilize the polyacetal carboxylate against rapid depolymerization in alkaline solution. The stabilized polyacetal carboxylate is then reacted with a base, such as lithium hydroxide, sodium hydroxide, potassium hydroxide, ammonium hydroxide, alkanol ammonium hydroxide, and the like to make the polyacetal carboxylate salt suitable for use as a builder and as a sequestrant.

The glyoxylic acid can be converted to the ester by reaction with any number of alcohols, such as methanol, ethanol, propanol, isopropanol, and the like. It is only necessary that the ester group does not interfere with the subsequent polymerization. Methanol is preferred.

Any number of initiators can be used for the polymerization. Nonionic or ionic initiators provide satisfactory results. Suitable initiators include 2-hydroxy pyridine —$H_2O$ complex; triethyl amine; ethylvinyl ethertrifluoroacetic acid, and the like. Even traces of hydroxy ion or cyanide ion will trigger the polymerization under nonaqueous conditions. Compounds such as diethylsodiomalonate or sodiomethylmalonate esters have been used with good results.

Any number of chemically reactive groups can be added to the polyacetal carboxylate termini to stabilize the polyacetal carboxylate against rapid depolymerization in an alkaline solution. It is only necessary that the chemically reactive group stabilizes the polyacetal carboxylate against rapid depolymerization in an alkaline solution, and the specific nature of the chemically reactive group is not important in the proper function of the polyacetal carboxylate in its intended use. As an example, suitable chemically stable end groups include stable substituent moieties derived from otherwise stable compounds, such as alkanes, such as methane, ethane, propane, butane and higher alkanes such as decane, dodecane, octadecane and the like; alkenes such as ethylene, propylene, butylene, decene, dodecene and the like; branched chain hydrocarbons, both saturated and unsaturated, such as 2-methyl butane, 2-methyl butene, 4-butyl-2,3-dimethyl octane and the like; aromatic hydrocarbons such as benzene, toluene, xylene and the like; cycloalkanes and cycloalkenes such as cyclohexane and cyclohexene and the like; haloalkanes such as chloromethane, chlorobutane, dichloropentane and the like; alcohols such as methanol, ethanol, 2-propanol, cyclohexanol, sodium phenate and the like; polyhydric alcohols such as 1,2-ethane diol, 1,4-benzene diol and the like; mercaptans such as methane thiol, 1,2-ethanedithiol and the like; ethers such as methoxyethane methyl ether, ethyl ether, ethoxypropane and cyclic ethers such as ethylene oxide, epichlorohydrin, tetramethylene oxide and the like; aldehydes and ketones such as ethanal, acetone, propanal, methylethyl ketone and the like; and carboxylate-containing compounds such as the alkali metal salts of carboxylic acids, the esters of carboxylic acids and the anhydrides. The above listing is intended to be instructive and is not intended to be limited since chemically stable end groups that stabilize the polyacetal carboxylate against rapid depolymerization in alkaline solution include nitrilo groups and halides such as chlorides, bromides and the like. Particularly suitable end groups include alkyl groups and cyclic alkyl groups containing oxygen: such as oxyalkyl groups like methoxy, ethoxy and the like; carboxylic acids such as —$CH_2COOM$,

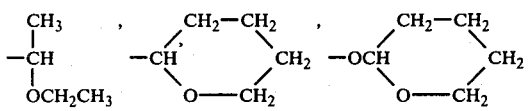

and the like; aldehydes, ethers and other oxygen-containing alkyl groups such as —$OCHCH_3OC_2H_5$, $-(OCH_2CH_2)_{1-4}OH$, $-(CH_2CH_2O)_{1-4}H$, $$\begin{array}{cccc} CH_3 & CH_2-CH_2 & CH_2-CH_2 \\ | & / \quad \backslash & / \quad \backslash \\ -CH & -CH \quad CH_2 & -OCH \quad CH_2 \\ | & \backslash \quad / & \backslash \quad / \\ OCH_2CH_3 & O-CH_2 & O-CH_2 \end{array}$$

and the like. In the above examples of suitable end groups, M is alkali metal, ammonium, alkanol amine, alkyl groups having 1 to 4 carbon atoms, tetralkyl ammonium groups and alkanol amine groups having from 1 to 4 carbon atoms in the alkyl chain, and R is hydrogen or alkyl group of 1 to 8 carbon atoms. As will occur to those skilled in the art in light of the present disclosure, the chemically stable end groups at the polyacetal carboxylate termini can be alike or unlike.

As a further example of the polyacetal carboxylates of the present invention wherein the end groups can be different, one end group can be a polymer, and particularly a polymer with an anionic charge, which permits one or more of the polyacetal carboxylates of the present invention to be appended to the polymer, or on the other hand, the polyacetal carboxylates of the present invention can be the part of a block copolymer having a polymer chain at each of the polyacetal carboxylate termini. Preferred polymers that are anionic or can be made anionic include: polymers of cellulose acetate, cellulose propionate, cellulose acetate butyrate, polyvinyl acetate, polyvinyl alcohol and the like. In the case of an anionic polymer, the polymer can be used to initiate the polymerization to form the polyacetal carboxylates wherein the polymer adds to the termini as one of the chemically stable end groups to stabilize that end of the polyacetal carboxylate against rapid depolymerization in an alkaline solution, and thereafter the other end of the polyacetal carboxylate can be stabilized with a compound such as ethylene oxide or the like, as described above.

In one embodiment of this invention, diethylsodiomalonate or sodiomethylmalonate is used as an initiator to form the polymer. These compounds not only serve to initiate the polymerization, but also the ester adds to the termini as one of the chemically stable end groups to stabilize that end of the polyacetal carboxylate against rapid hydrolysis in an alkaline solution. These compounds can be prepared from the corresponding esters using sodium hydride in a solvent, such as tetrahydrofuran, by techniques known to those skilled in the art.

Accordingly, it can be seen that in one embodiment of this invention there is provided a detergent composition comprising at least 5 percent by weight of a surfactant selected from the group consisting of anionic, nonionic, zwitterionic, ampholytic and amphoteric surfactants; and at least 1 weight percent of a water-soluble polyacetal carboxylate having the structure:

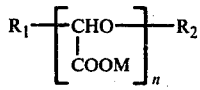

wherein M is selected from the group consisting of alkali metal, ammonium, tetralkyl ammonium groups and alkanol amine groups having from 1 to about 4 carbon atoms in the alkyl chain; n averages at least 4; and $R_1$ and $R_2$ are individually any chemically stable group which stabilize the polyacetal carboxylate against rapid depolymerization in alkaline solution.

The number of repeating units, i.e., the value of n, in the polyacetal carboxylate is important since the effectiveness of the polyacetal carboxylate salt as a detergency builder is affected by the chain length. Even when there are as few as four repeating units (i.e., n averages 4), the polyacetal carboxylate salt shows some effectiveness as a sequestrant, chelating agent and builder. Although there is no upper limit to the desired number of repeating units, which may be as high as 400, or even higher, there does not seem to be an advantage to having more than about 200 repeating units. When the number of repeating units exceeds about 100, significant improvement in sequestration, chelation and builder properties is not observed. Thus, it is preferred that the polyacetal carboxylate contain between about 10 and about 200 units, and even more preferred that the polyacetal carboxylate contains between about 50 and about 100 repeating units.

The most important factors believed to control the chain length include (1) the initiator concentration, (2) the temperature of the polymerization, (3) the purity of the starting materials, and (4) the presence of solvents and their levels. As will occur to those skilled in the art, the concentration of the initiator, solvents and their levels, and the temperature of the polymerization reaction are all interrelated and the desired chain length can easily be controlled by simple experimentation by controlling these variables. Generally speaking, the lower the temperature at the beginning of the polymerization, the higher the chain length. For example, when polymerization was initiated with one mole percent 2-hydroxy pyridine —$H_2O$ complex at a temperature of −70° C., the resulting polyacetal carboxylate contained 60 repeating units as determined by Proton Magnetic Resonance (PMR). On the other hand, when one mole percent 2-hydroxy pyridine —$H_2O$ complex was used at about 20° C., the resulting polyacetal carboxylate had only about 20 repeating units.

The polyacetal carboxylate can also contain other polymer fragments, and accordingly, the polymer can be a linear homopolymer or copolymer, or it can be branched. To form a copolymer, the polyacetal carboxylate segments are polymerized with any number of chain extending agents known to those skilled in the art. It is only necessary that the chain extending agent does not cause the polyacetal carboxylate to rapidly depolymerize in alkaline solution, or become insoluble in water. Either aliphatic or aromatic chain extending agents can be used, but aliphatic chain extending agents are preferred to make the polymer more environmentally acceptable, and aliphatic chain extending agents having from one to four carbon atoms, such as ethylene oxide or propylene oxide, are especially preferred.

It is important that a copolymer contains at least 4 repeating units (i.e., n averages at least 4) of the acetal carboxylate to insure that the copolymer will effectively sequester calcium and magnesium ions and provide builder properties. It is preferred that the copolymer contain at least 10 repeating units of acetal carboxylate, or more, say 50 or 100 repeating units, for the reasons described above. As will occur to those skilled in the art in light of the present disclosure, having at least 4 acetal carboxylate units in a copolymer prepared by block or graft polymerization techniques should not present a problem, but when acetal carboxylate esters are copolymerized with a chain extending agent, the amount of acetal carboxylate should be at least about 50 percent by weight, based on the total weight of the polymer, to insure that the polymer will effectively sequester calcium and magnesium ions and retain its builder properties. It is preferred that the amount of acetal carboxylate is 80 percent by weight, based on the total weight of the polymer, or even higher.

As will occur to those skilled in the art, any number of chain extending agents can be copolymerized with the polyacetal carboxylates of the present invention. It is only necessary that the chain extending agent will provide at least two reactive sites and does not cause the polyacetal carboxylates to depolymerize in alkaline solution. Suitable chain extending agents include: polyhydric alcohols, such as ethylene glycol, propylene glycol and the like; epoxy compounds, such as ethylene oxide, propylene oxide, epihalohydrin epoxysuccinates and the like; aldehydes, such as formaldehyde, acetaldehyde, and the like. It is particularly beneficial when the chain extending agent contains substituent carboxy groups.

Thus, it can be seen that in one embodiment of this invention there is provided a detergent composition comprising at least 5 percent by weight of a surfactant selected from the group consisting of anionic, nonionic, zwitterionic, ampholytic and amphoteric surfactants; and at least 1 weight percent of a stabilized water-soluble polymer comprising polyacetal carboxylate segments having the general formula:

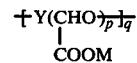

where Y is at least one chain extending agent, preferably alkyl or oxyalkyl having 1 to 4 carbon atoms, p averages at least 4, q is at least 1, and M is selected from the group consisting of alkali metal, ammonium, tetralkyl ammonium groups and alkanol amine groups having from 1 to about 4 carbon atoms in the alkyl chain. Furthermore, the polyacetal carboxylates having a chain extending agent can be stabilized against rapid depolymerization in alkaline solution by the same techniques used above using suitable reagents or polymers as described above.

The polyacetal carboxylate ester can be converted to the corresponding alakli metal, ammonium, tetralkyl ammonium or alkanol amine salts by conventional saponification techniques, and such salts are especially useful as a builder in detergent formulations. Since the pH of a detergent solution is usually between pH 9 and pH 10, the polyacetal carboxylate salt will not depolymerize rapidly when used as a detergent builder in aqueous solution at normal use concentrations (1 cup/washer), temperatures (10°-60° C.), and times (i.e., about 15 minutes) typical of United States home laundry practices. Generally, the use of the alkali metal salts, particularly the sodium salt, is preferred. However, in some formulations where greater builder solubility is required, the use of ammonium or alkanol amine salts may be desirable.

The detergent compositions will contain at least 1 percent by weight and preferably at least 5 percent by weight of the polyacetal carboxylate salt. In order to obtain the maximum advantages of the compositions of this invention, the detergent should preferably contain from about 5 percent to about 75 percent of these salts. The salt can be the sole detergency builder, or these salts can be utilized in combination with other detergency builders which may constitute from 0 to 95 percent by weight of the total builders in the composition. By way of example, builders which can be employed in combination with the polyacetal carboxylate salts in accordance with this invention include either water insoluble materials, such as sodium alumino-silicates, commonly known as zeolites, or water soluble inorganic builder salts such as alkali metal polyphosphates, i.e., the tripolyphosphates and pyrophosphates, alkali metal carbonates, borates, bicarbonates and silicates and water soluble organic builders, including amino polycarboxylic acids and salts, such as alkali metal nitrilotriacetates, cycloalkane polycarboxylic acids and salts, ether polycarboxylates, alkyl polycarboxylates, epoxy polycarboxylates, tetrahydrofuran polycarboxylates, such as 1,2,3,4 or 2,2,5,5 tetrahydrofuran tetracarboxylates, benzene polycarboxylates, oxidized starches, amino(trimethylene phosphonic acid) salts, diphosphonic acid salts (e.g., the sodium salts of methylene diphosphonic acid or 1-hydroxy ethylidene 1,1-dimethylenephosphonic acid), and the like.

The detergent compositions will generally contain from 5 percent to 95 percent by weight total builder (although greater or lesser quantities may be employed if desired). The total amount of builder employed will be dependent on the intended use of the detergent composition, other ingredients of the composition, pH conditions, and the like. For example, general laundry powder formulations will usually contain from about 20 percent to about 60 percent builder; and machine dishwashing formulations will usually contain from about 60 percent to about 90 percent builder. Optimum levels of builder content as well as optimum mixtures of builders of this invention with other builders for various uses can be determined by routine tests in accordance with conventional detergent formulation practice.

The detergent formulations will generally contain a water soluble detergent surfactant, although the surfactant ingredient may be omitted from machine dishwashing formulations. Any water soluble anionic, nonionic, zwitterionic or amphoteric surfactant can be employed.

Examples of suitable anionic surfactants include soaps such as the salts of fatty acids containing about 9 to 20 carbon atoms, e.g., salts of fatty acids derived from coconut oil and tallow; alkyl benzene sulfonates — particularly linear alkyl benzene sulfonates in which the alkyl group contains from 10 to 16 carbon atoms; alcohol sulfates; ethoxylated alcohol sulfates, hydroxy alkyl sulfonates; alkyl sulfates and sulfonates; monoglyceride sulfates; acid condensates of fatty acid chlorides with hydroxy alkyl sulfonates; and the like.

Examples of suitable nonionic surfactants include alkylene oxide (e.g., ethylene oxide) condensates of mono and polyhydroxy alcohols, alkyl phenols, fatty acid amides, and fatty amines; amine oxides; sugar derivatives such as sucrose monopalmitate; long chain tertiary phosphine oxides; dialkyl sulfoxides; fatty acid amides, (e.g., mono or diethanol amides of fatty acids containing 10 to 18 carbon atoms); and the like.

Examples of suitable zwitterionic surfactants include derivatives of aliphatic quaternary ammonium compounds such as 3-(N,N-dimethyl-N-hexadecylammonio) propane-1-sulfonate and 3-(N,N-dimethyl-N-hexadecylammonio)-2-hydroxy propane-1-sulfonate.

Examples of suitable amphoteric surfactants include betains, sulfobetains and fatty acid imidazole carboxylates and sulfonates.

It will be understood that the above examples of surfactants are by no means comprehensive and that numerous other surfactants are known to those skilled in the art. It will be further understood that the choice and use of surfactants will be in accordance with well understood practices of detergent formulation. For example, anionic surfactants, particularly linear alkyl benzene sulfonate are preferred for use in general laundry formulations, whereas low foaming nonionic surfactants are preferred for use in machine dishwashing formulations.

The quantity of surfactant employed in the detergent compositions of this invention will depend on the surfactant chosen and the intended end use. In general, the compositions will contain from 5 percent to 50 percent surfactant by weight, although as much as 95 percent or more surfactant may be employed if desired. For example, general laundry powder formulations normally contain 5 percent to 50 percent, preferably 15 percent to 25 percent surfactant. Machine dishwashing formulations normally contain about 0.5 percent to about 5 percent surfactant. Liquid dishwashing formulations normally contain about 20 percent to about 45 percent surfactant. The weight ratio of surfactant to builder will generally be in the range of from 1:12 to 2:1.

In addition to builder and surfactant components, the detergent composition may contain fillers such as sodium sulfate and minor amounts of bleaches, dyes, optical brighteners, soil anti-redeposition agents, perfumes, and the like.

In machine dishwashing compositions, the surfactant will be a low-foaming nonionic surfactant which will constitute 0 to 5 percent of the formulation.

It is to noted that when the alkali ammonium or alkanol ammonium salts of the present invention are used as builders, they will be used generally in an alkaline medium. When the compositions of the present invention are used at a pH of 7 or below, the polymer salt depolymerizes. Thus, it can be seen that the compositions of the present invention are effective cleaning agents, but when an aqueous solution containing the composition is discharged into a sewer or other waste water system, the polyacetal carboxylate salt will soon depolymerize into small fragments which are readily biodegradable.

DESCRIPTION OF THE PREFERRED EMBODIMENTS

This invention is illustrated by, but not limited to, the following Examples wherein all percentages are by weight unless otherwise noted.

EXAMPLE I

To a 50 milliliter single-necked, round-bottomed reaction flask equipped with a magnetic stirrer was added 10 grams (0.114 mole) of freshly distilled methyl glyoxylate and 4 milliliters of methylene chloride. The temperature of the flask and the contents was lowered to about 0° C., and 0.5 milliliters of 0.05 molar sodium diethyl methylmalonate was added to initiate polymerization. The flask was kept in an ice bath, and when the temperature returned to 0–2° C., (about 45 minutes) 0.18 milliliter trifluoroacetic acid (1.5 mole percent) and 3.5 milliliters of ethyl vinyl ether was added to the mixture. The mixture was stirred at room temperature overnight. About 2 milliliters of 1 molar NaOH solution was added to the mixture and the volatiles were removed under vacuum. Then 12 milliliters of 2.5 molar NaOH was added. The mixture was stirred at about 0° C. for about 5 hours and then heated to about 40° C. for about 24 hours. The methanol and residual solvents were removed by rotary evaporation. The solution was concentrated to about 15 percent, precipitated in about 100 milliliters of methanol and stirred for 30 minutes. The precipitate was recovered by filtration and dried. The precipitate was then redissolved in distilled water, precipitated into methanol, stirred and recovered by filtration. The yield was about 74.8 percent. Analysis of the product, including the chain length, by Proton Magnetic Resonance (PMR) Spectra Analysis, showed that the product was a mixture, mostly a polymer having the following formula:

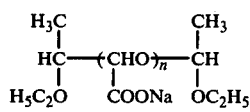

where n averages 40, and a minor amount of

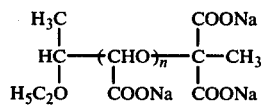

EXAMPLES II THROUGH IV

The procedure of Example I was repeated except that the temperature of initiation was varied. The result of this variation of the temperature of initiation on the chain length as determined by the average value of n is shown in the following tabulation:

| Example | Temperature of Initiation (°C.) | n |
|---|---|---|
| 2 | −70 | 60 |
| 3 | −20 | 55 |
| 4 | 20 | 20 |

EXAMPLE V

The procedure of Example I was repeated except different initiation temperatures were used to provide a series of samples having different chain lengths, as measured by PMR. These samples were tested for sequestration function using the procedures described by Matzner et al ("Organic Builder Salts as Replacements for Sodium Tripolyphosphate", TENSIDE DETERGENTS, 10 No. 3, pages 119–125) 1973. The sequestration of calcium ions and magnesium ions (as a percent of STP performance) as a function of chain length is shown below:

| Chain Length (n) | % STP |
|---|---|
| 2 | 50 |
| 20 | 114 |
| 45 | 157 |
| 70 | 169 |
| 130 | 172 |

Thus, it can be seen that a sequestration performance plateau of 160 to 170 percent of STP was reached at a chain length of about 45 or greater, but only a small increase in performance occurred at greater chain lengths.

EXAMPLE VI

The biodegradation of three of the samples from Example V was measured by diluting one part of an activated sewerage sludge with about 10 parts of river water, and adding a known amount of the polymer to the diluted sludge. The biodegradation is determined by measuring the $CO_2$ evolution from the diluted sludge.

The evaluation of carbon dioxide was generally independent of the chain length and comparable to materials known to be completely biodegradable. The results are presented in the following tabulation:

| Chain Length | $CO_2$ Evolved (% Theory) | | |
|---|---|---|---|
| | 1 Week | 3 Weeks | 4 Weeks |
| 20 | 9.8 | 59 | 73 |
| 45 | 11.7 | 56 | 67 |
| 120 | 18.5 | 58 | 66 |

EXAMPLE VII

The general procedure of Example I is repeated except that about 50 mole percent methyl glyoxylate and about 50 mole percent ethylene oxide is added to the reaction flask in a methylene chloride solvent using boron trifluoride in ethyl ether as the initiator. The polymer is analyzed by PMR, which showed a major amount of the following composition:

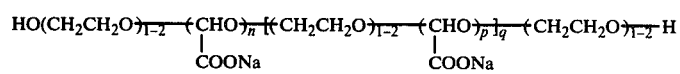

wherein n and p are about 20 and q is at least 1. The acetal carboxylate segments comprise about 83 percent of the weight of the total polymer.

EXAMPLE VIII

The procedure of Example VII is repeated except that about 5 mole percent ethylene oxide is mixed with about 95 mole percent methyl glyoxylate. The polymer is analyzed by PMR, and the composition is the same as in Example VII except that the acetal carboxylate segments comprise about 98 percent of the weight of the total polymer.

EXAMPLE IX

About 4.4 grams (0.05 mole) of methyl glyoxylate was diluted with about 1.5 milliliters of methylene chloride, and the temperature was reduced to about −10° C. Then about 1.2 mole percent boron trifluoride diethyl etherate was added to the methyl glyoxylate solution. After about 30 minutes 0.01 mole ethylene oxide was added and allowed to react at about 22° C. for about 34 hours. The resulting stabilized polymer was hydrolyzed using 2.5 molar NaOH as in Example I. Analysis by PMR showed that the yield was about 73 percent. The average mole ratio of polyacetal carboxylate segments to oxyethylene groups was about 8.4 to 1.

Sequestration performance of the polymer as determined by the procedure of Example V showed that the salt was about 104 percent of STP performance.

EXAMPLE X

Using the general procedure of Example I, about 50 grams of unstabilized polymer is prepared by polymerizing methyl glyoxylate using a trace of 10 normal sodium hydroxide as the initiator. The resulting polymer is diluted with sufficient methylene chloride to permit stirring at 0° C. Then, 5 gram portions were taken and separately stabilized using a variety of chemically stable end groups. The reagent and the catalyst employed to provide chemically stable end groups, the time and temperature of adding the end groups, and the identification of the end groups are shown in Table 1.

TABLE 1

| | POLYMER STABILIZATION | | | | |
|---|---|---|---|---|---|
| CATALYST | REAGENT | TIME(HRS.) | TEMP.(° C.) | $R_1$ | $R_2$ |
| $BF_3$ Etherate | Ethylene Oxide | 48 | 25 | $HO(CH_2CH_2O)_{1-3}$— | —$(CH_2CH_2O)_{1-3}H$ |
| $CF_3COOH$ | Ethyl Vinyl Ether | 16 | 25 | $CH_3\overset{H}{\underset{OCH_2CH_3}{C}}-O-$ | $-\overset{H}{\underset{OCH_2CH_3}{C}}-CH_3$ |
| $CF_3COOH$ | Dihydropyran | 16 | 25 | (cyclic ether group with CHO) | (cyclic ether group) |
| Conc. $H_2SO_4$ | Diethyl Ethoxymethylene Malonate | 16 | 25 | $COOC_2H_5$<br>\|<br>$CHCHO-$<br>\|<br>$OC_2H_5$<br>\|<br>$COOC_2H_5$ | $H_5C_2OOC$<br>\|<br>$-CHCH$<br>\|<br>$H_5C_2O$<br>\|<br>$H_5C_2OOC$ |
| $K_2CO_3$ | Dimethylsulfate | 24 | 40 | $H_3CO-$ | $-CH_3$ |
| $CF_3COOH$ | Dodecyl Vinyl Ether | 16 | 25 | $H_3CCHO-$<br>\|<br>$O(CH_2)_{11}CH_3$ | $-CHCH_3$<br>\|<br>$O(CH_2)_{11}CH_3$ |
| Conc. $H_2SO_4$ | Isobutylene | 24 | 25 | $CH_3$<br>\|<br>$H_3C-CO-$<br>\|<br>$CH_3$ | $CH_3$<br>\|<br>$-C-CH_3$<br>\|<br>$CH_3$ |
| $BF_3$ Etherate | Trimethylorthoformate | 24 | 25 | Mixture of $H_3CO-$ and<br>$H_3CO$<br>\|<br>$HCO-$<br>\|<br>$H_3CO$ | Mixture of $CH_3$ and<br>$OCH_3$<br>\|<br>$-CH$<br>\|<br>$OCH_3$ |
| $BF_3$ Etherate | Epichlorohydrin | 24 | 25 | $HO(CH_2CHO)_{1-3}$—<br>\|<br>$Cl$ | —$(CHCH_2O)_{1-3}H$<br>\|<br>$Cl$ |
| $BF_3$ Etherate | Ethyl-2,3-Epoxy Butyrate | 24 | 25 | $CH_3$<br>\|<br>$HO(CHCHO)_{1-3}$—<br>\|<br>$H_5C_2OOC$ | $CH_3$<br>\|<br>—$(CHCHO)_{1-3}H$<br>\|<br>$COOC_2H_5$ |
| $BF_3$ Etherate | Diethyl cis epoxysuccinate | 48 | 25 | $COOC_2H_5$<br>\|<br>$HO(CHCHO)_{1-3}$—<br>\|<br>$H_5C_2OOC$ | $COOC_2H_5$<br>\|<br>—$(CHCHO)_{1-3}H$<br>\|<br>$COOC_2H_5$ |

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A detergent composition comprising at least 5 percent by weight of a surfactant selected from the group consisting of anionic, nonionic, zwitterionic, ampholytic and amphoteric surfactants; and at least 1 weight percent of a stabilized water-soluble polymer comprising polyacetal carboxylate segments having the structure:

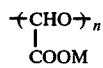

wherein M is selected from the group consisting of alkali metal, ammonium, tetralkyl ammonium and alkanol amine groups having from 1 to about 4 carbon atoms in the alkyl chain; n averages at least 4; and the total number of polyacetal carboxylate segments comprise at least 50 percent by weight of the total polymer.

2. A detergent composition of claim 1 wherein the polymer comprises at least 5 weight percent of the detergent composition.

3. A detergent composition of claim 1 wherein the polymer comprises from about 5 to about 75 weight percent of the detergent composition.

4. A detergent composition of claim 1 wherein n averages between 10 and about 200.

5. A detergent composition of claim 1 wherein n averages between about 50 and about 200.

6. A detergent composition of claim 1 wherein M is an alkali metal.

7. A detergent composition of claim 1 wherein M is sodium.

8. A detergent composition of claim 1 wherein the polymer comprises polyacetal carboxylate segments having the general formula:

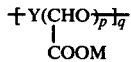

wherein Y is a chain extending agent, p averages at least 4, and q is at least 1.

9. A detergent composition of claim 8 wherein the chain extending agent is an oxyalkyl group having from one to about four carbon atoms.

10. A detergent composition of claim 8 wherein the polyacetal carboxylate segments in the polymer comprise at least 80 percent by weight of the total polymer.

11. A detergent composition of claim 8 wherein M is an alkali metal.

12. A detergent composition of claim 8 wherein M is sodium.

13. A detergent composition of claim 8 wherein the chain extending agent is at least one -(-CH₂CH₂O-)-.

14. A detergent composition of claim 8 wherein the chain extending agent is at least one -(-CH₂CH(CH₃)O-)-.

15. A detergent composition of claim 8 wherein the chain extending agent is at least one -(-CH₂CH₂O-)- and M is an alkali metal.

16. A detergent composition of claim 15 wherein M is sodium.

17. A detergent composition comprising at least 5 percent by weight of a surfactant selected from the group consisting of anionic, nonionic, zwitterionic, ampholytic and amphoteric surfactants; and at least 1 weight percent of a water-soluble polyacetal carboxylate having the structure:

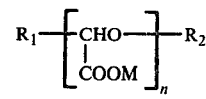

wherein M is selected from the group consisting of alkali metal, ammonium, tetralkyl ammonium groups and alkanol amine groups having from 1 to about 4 carbon atoms in the alkyl chain; n averages at least 4; $R_1$ and $R_2$ are individually any chemically stable group which stabilize the polyacetal carboxylate against rapid depolymerization in alkaline solution; and the total number of polyacetal carboxylate segments comprise at least 50 percent by weight of the total polymer.

18. A composition of claim 17 wherein $R_1$ and $R_2$ are individually selected from the group consisting of alkyl and cyclic alkyl groups containing oxygen.

19. A detergent composition of claim 17 wherein $R_1$ is selected from the group consisting of $-OCH_3$, $-OC_2H_5$, $HO(CH_2CH_2O)_{1-4}$,

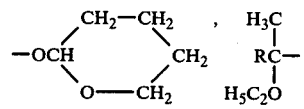

and mixtures thereof and $R_2$ is selected from the group consisting of $-CH_3$, $-C_2H_5$, $-(CH_2CH_2O)_{1-4}H$,

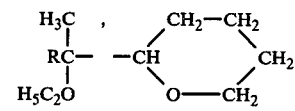

and mixtures thereof, where R is hydrogen or alkyl having 1 to 8 carbon atoms.

20. A detergent composition of claim 17 wherein n is a number between 4 and about 400.

21. A detergent composition of claim 17 wherein n is a number between about 50 and about 200.

22. A detergent composition of claim 17 wherein M is an alkali metal.

23. A detergent composition of claim 17 wherein M is sodium, $R_1$ is

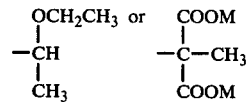

or mixtures thereof, and $R_2$ is

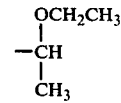

and n averages between about 50 and about 200.

24. A detergent composition of claim 17 wherein $R_1$ is $HO(CH_2CH_2O)_{1-4}$, $R_2$ is $-(CH_2CH_2O)_{1-4}H$, M is sodium and n averages between about 50 and about 200.

* * * * *